Sept. 30, 1958     L. A. GRAHAM ET AL     2,853,899
VARIABLE SPEED TRANSMISSION

Filed Aug. 9, 1955                             3 Sheets-Sheet 1

INVENTOR.
LOUIS A. GRAHAM
BY RICHARD A. GRAHAM

John W. Michael
ATTORNEY

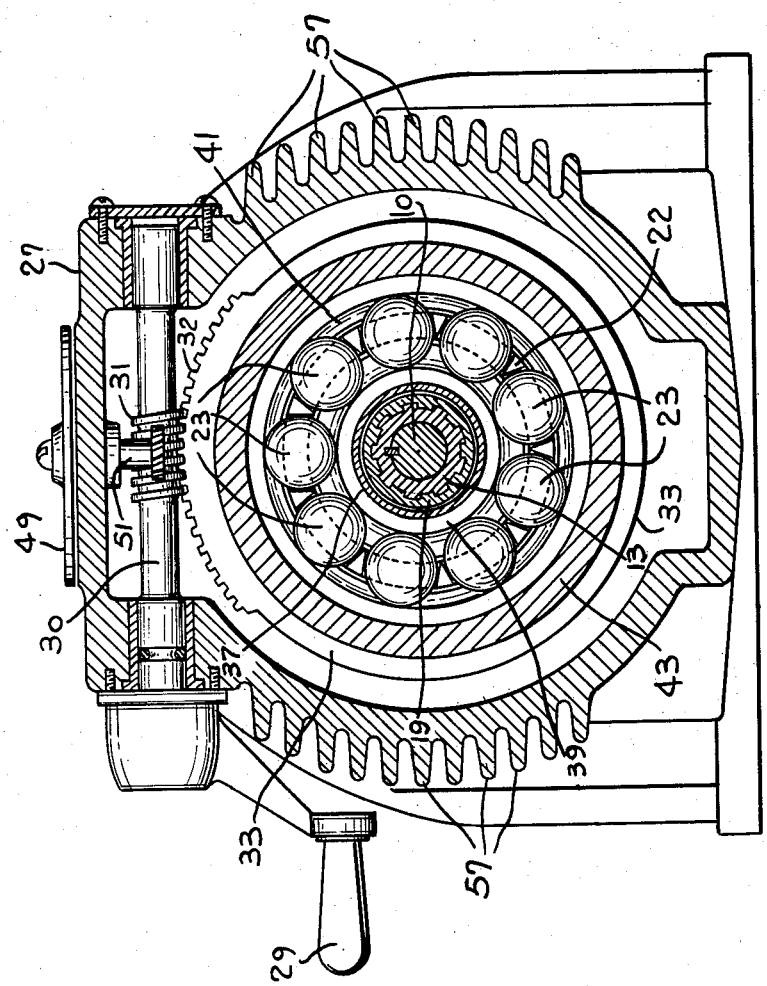
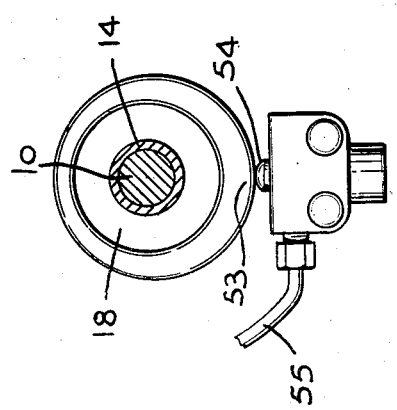

Sept. 30, 1958

L. A. GRAHAM ET AL 2,853,899

VARIABLE SPEED TRANSMISSION

Filed Aug. 9, 1955

INVENTOR.
LOUIS A. GRAHAM
BY RICHARD A. GRAHAM

John W. Michael
ATTORNEY

United States Patent Office 2,853,899
Patented Sept. 30, 1958

2,853,899

VARIABLE SPEED TRANSMISSION

Louis A. Graham, Milwaukee, and Richard A. Graham, Thiensville, Wis.

Application August 9, 1955, Serial No. 527,251

21 Claims. (Cl. 74—796)

This invention relates to a variable speed transmission utilizing two stages of ball drives wherein the first stage is a planetary driving from the planets to the sun while the second stage is a differential.

The principal object of this invention is to provide a variable speed transmission capable of transmitting comparatively high power with a transmission of small size.

Another object of this invention is to provide a transmission capable of handling relatively large loads at low cost.

In the present transmission the driving motor drives the planetary cage of the first stage which comprises a planetary step-up driving to the sun. The sun of the first stage is connected to the sun of the second stage which is a differential having its ring as the output and its planetary cage rotatable at motor speed. The sun and ring in both stages comprise split races which the ball planets contact. Varying the spacing of the races in either or both stages acts to vary the output speed. One of the outstanding advantages of this transmission is that the high speed suns of the first and second stages require no bearing support other than the bearing support the planetary balls afford. Since the output is a differential, a stalling load will not damage the transmission.

Other objects and advantages will be pointed out in, or be apparent from, the specification and claims, as will obvious modifications of the two embodiments shown in the drawings in which:

Fig. 2 is a vertical section taken as indicated by line 2—2 on Fig. 1;

Fig. 3 is a fragmentary section taken as indicated by line 3—3 on Fig. 1 to show one form of lubricant pumping apparatus.

Figure 1:
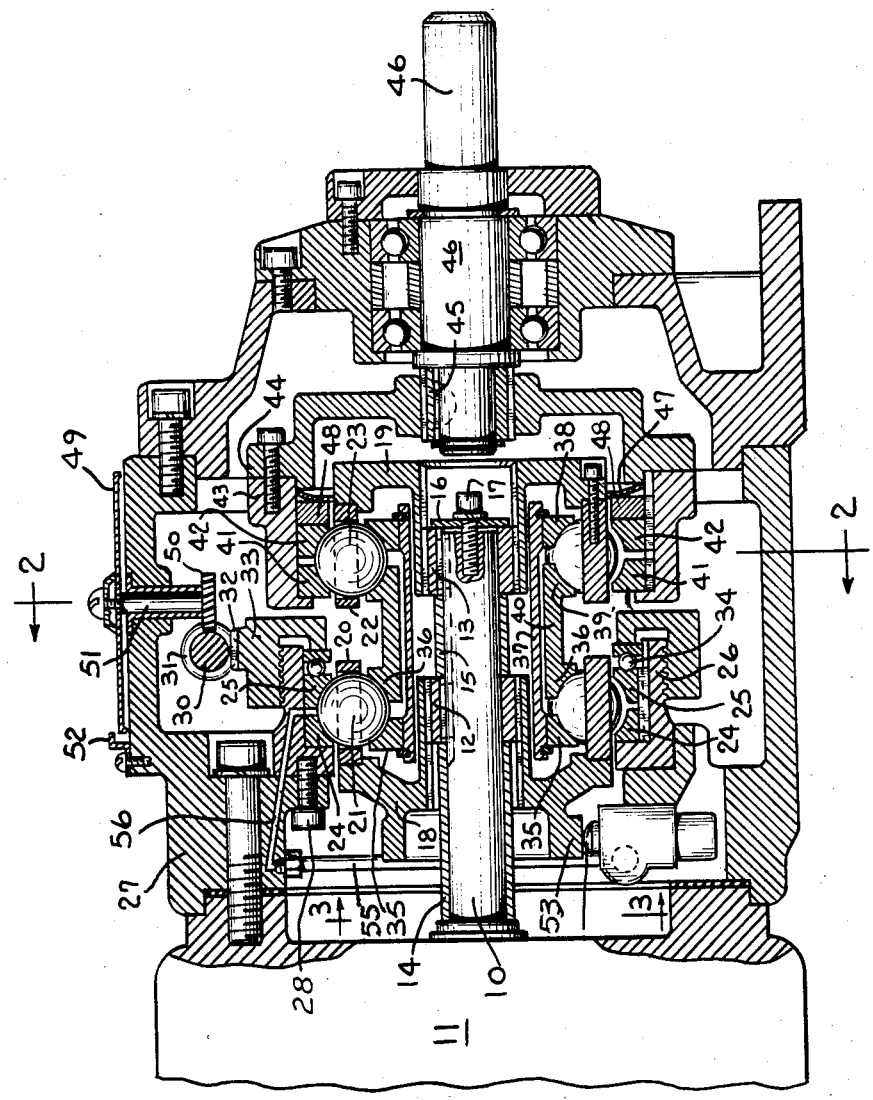
Fig. 1 is a vertical section through the length of a transmission according to this invention.

The drawings show the transmission directly connected to a motor casing but it will be understood that the transmission need not be so mounted. The motor shaft 10 projects from the motor casing 11 with driving splines 12 and 13 keyed to the shaft 10. The driving splines 12 and 13 are spaced on shaft 10 by sleeves 14, 15 and are retained against axial movement by means of washer 16 retained on the shaft by bolt 17. Cage drivers 18 and 19 are mounted on splines 12 and 13 respectively to rotate in unison. The input or first stage cage driver 18 includes an annular cage member 20 having radial holes bored therein each of which receives a ball 21. Similarly, the second stage cage driver includes cage 22 carrying balls 23. As shaft 10 rotates the first cage the balls 21 roll on the stationary races 24, 25 splined to member 26 which is connected to the housing 27 by bolts 28. The split outer races 24, 25 on the first stage permit the separation between the races to be varied by turning handle 29 (see Fig. 2) to rotate shaft 30 so that worm gear 31 engages the gear segment 32 on ring 33. Ring 33 is threadably connected to member 26 (Fig. 1) so that rotation of the ring causes the ring to act on the race 25 through thrust bearing 34 to move the race 25 towards or from the race 24. As the races move together the balls 21 in the first stage will, of course, be forced inwardly and the balls will move outwardly when the separation between the races is increased.

As the first stage balls roll on the stationary races 24, 25, the inner races 35, 36 will be forced to rotate at high speed. It will be noted that race 35 is fixed on sleeve 37 which also carries a race 38 forming one-half of the inner race of the second stage. The other second stage inner race 39 is carried by a sleeve-like member 40 which carries race 36 on the first stage. The second stage balls, of course engage the split races 38, 39 and are driven at motor speed by cage 22 about the axis of shaft 10. The second stage balls engage the outer races 41, 42, which are splined to sleeve 43 connected to spider 44 which is splined to a splined sleeve 45 keyed to the output shaft 46. An annular spring 47 acts between race 42 and spider 44 to load the balls into contact with the various races throughout the transmission in a manner to be described more fully hereinafter. This spring, called a Belleville spring, is initially loaded so that deflection of the spring in operation will be in the negative rate region of its curve.

It will be noted that cage drivers 18 and 19 drive the first and second stages of balls at motor speed. The outer races 24, 25 of the first stage are fixed and this makes the sun races 35, 36 of the first stage and the inner races 38, 39 of the second stage rotate at high speed. Since the outer races 41, 42 of the second stage are rotatable with the output shaft 46, the second stage is a differential. Varying the spacing between the "ring races" 24, 25 of the first stage affects the radial position of the first stage balls 21 and this in turn affects the spacing of all the other races in the transmission with the end result of affecting the output speed of the shaft 46.

Spring 47 acts between the annular spacer 48 and spider 44 to exert a force which loads all the races in the transmission. The force of spring 47 to the left loads race 42 while the force of spring 47 to the right acts on the spider and annulus 43 to load race 41. Thus, both races 41 and 42 are equally loaded by spring 47. Since the horizontal and vertical components of the normal forces (perpendicular to a tangent common to the ball and race) between the balls and races 41 and 42 must be equally opposed, the vertical components must be opposed by equal vertical components between the balls and races 38 and 39 which have the same contact angle with the balls. This, of course, requires equal and opposite horizontal components at races 38 and 39. Therefore, the spring 47 loads all races 38, 39, 41 and 42. The forces applied to races 38 and 39 are applied to races 35, 36 since the races are interconnected, and these forces act through the first stage balls 21 to load races 24 and 25 in a similar manner. If shaft 30 is turned to rotate ring 32 to bring the races 24 and 25 closer together, the balls 21 in the first stage must move inwardly and this will spread races 35 and 36 which forces races 38 and 39 towards each other and moves the second stage balls 23 outwardly which in turn spreads races 41 and 42. The Belleville spring 47 will act to develop the contact forces throughout the transmission and the spline connection between spider 44 and the drive sleeve 45, keyed to the output shaft 46, permits the races 41 and 42 to adjust to the new position of the ball 23. During this procedure, the balls 21 and 23 will move axially slightly, but since the cages 18 and 19 are splined to the drive splines 12 and 13 such shifting can take place quite readily. It will be noted that the centers of the driving splines 12 and 13 are included in the planes including the centers of the balls of each stage. This prevents "overhung" loading and any tendency towards cocking of the drive cages is eliminated.

It will be appreciated that the sun races 35, 36, 38 and 39 are the high speed members in this transmission. It will be noted that these races are totally unsupported except by the balls of each stage. There is no need for separate high speed bearings which greatly adds to the life of this transmission.

Some additional construction features should be noted with respect to this design before passing on to the second modification. Rotation of worm shaft 30 is translated into movement of an indicator dial 49 by engagement between gear 50 and worm 31 to turn shaft 51 and rotate dial 49 under the indicator point 52. The first stage cage 18 is provided with a cam member 53 which is adapted to operate a pump plunger 54 to pump lubricating oil through conduit 55 and bore 56 to the space between the first stage outer races 24, 25 where the oil is sprayed in at the first stage balls. It is presently contemplated that an oil level approximately to the midpoint of the lowermost ball in either stage would be maintained inside the transmission housing and that splash lubrication would be relied upon in large part for lubricating the second stage. However, it may be necessary to spray oil in between the annulus 43 and ring 33. The oil, of course, helps cool the transmission and the transmission casing 27 is provided with fins 57 to facilitate heat transmission at the exterior of the housing.

It will be appreciated that while the drawings show the balls and the races as being the same radius, such would not be the case since the side spin losses would cause the destruction of the machine in very short order. Actually, the difference between the radius of the race and the diameter of the ball is very slight and in practice a 52 to 58 percent conformity (conformity equals race radius over ball diameter times 100) is employed (this as compared to approximately 52 percent used in ball bearing design).

Figure 4:
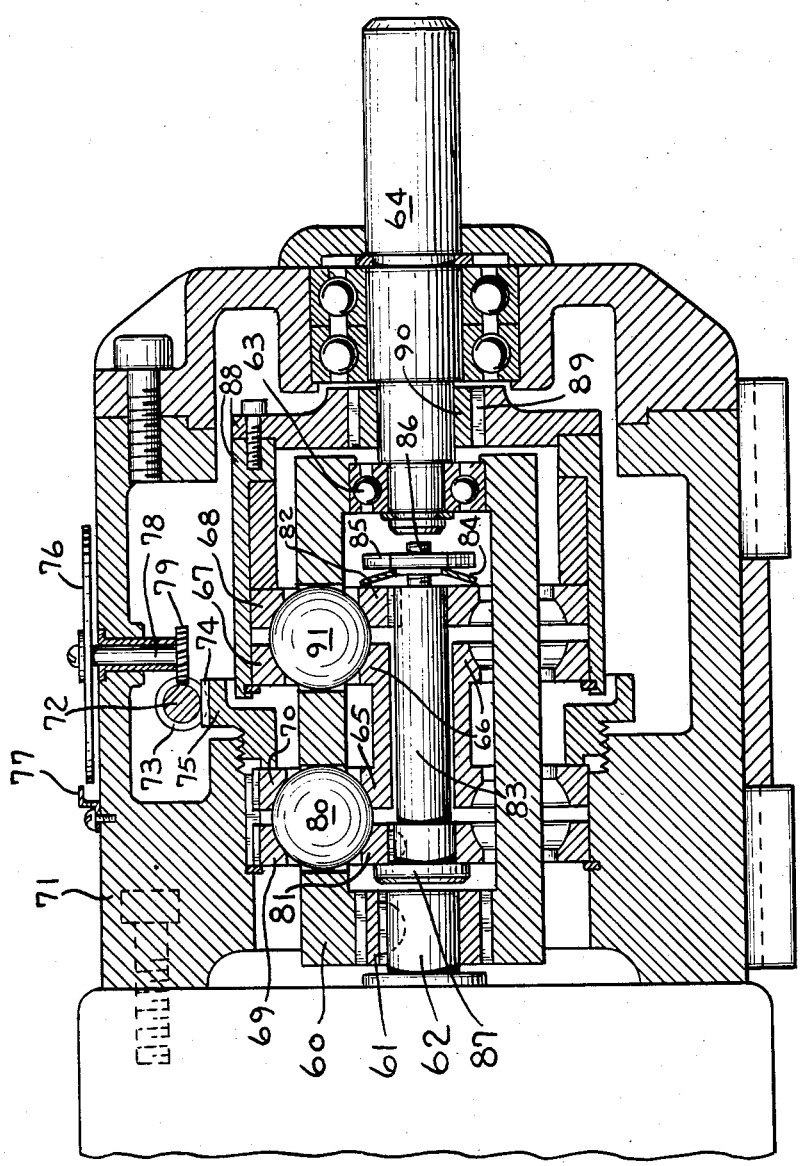
Fig. 4 is a view similar to Fig. 1, but shows a modified construction.

Turning now to the modification shown in Fig. 4, it will be apparent that there are two major differences between this modification and the modification shown in Fig. 1. A single one-piece cage 60 is splined on driving spline 61 keyed to the motor shaft 62. The right-hand end of the cage 60 rides on a pilot bearing 63 on the left-hand end of the output shaft 64. This one-piece cage for driving the two stages of balls requires quite accurate spacing between the holes for the two stages as well as requiring accurate spacing of the inner race members 65, 66. The second major point of difference is that the outer race members 67, 68 on the second stage are fixed so that the second or differential stage has a fixed ratio. In the first stage the outer races 69, 70 are splined to the housing 71 in much the same manner as in Fig. 1 and the movable race 70 is adjusted by turning shaft 72 so that worm 73 will engage gear segment 74 to turn ring 75 on the threaded connection to the housing and adjust the position of the race 70. It will be noted that in this case no thrust bearing is provided. As in Fig. 1 the speed adjustment is shown by the position of dial 76 with reference to pointer 77 with the dial being turned on shaft 78 through engagement of gear 79 with the worm 73.

Adjustment of the stationary races 69, 70 on the first stage will, of course, occasion movement of the balls 80 and this in turn requires relative movement between race 65 and race 81. The movement of races 65 and 81 will in turn require relative movement between race 66 and the inner race 82 on the second stage. This relative movement is obtained by virtue of the splined connection between inner race 82 and shaft 83. The annular negative rate spring 84 bears against inner race 82 and against washer or nut 85 mounted on the threaded shaft 86. This shaft passes through shaft 83 and terminates in the head 87 at the left-hand end of shaft 83. The head prevents the inner first stage race 81 from slipping off the left-hand end of shaft 83 while the Belleville spring 84 acts to load all races. Thus, the Belleville spring exerts its force on races 81 and 82 which, in turn, load the other races. Since the output cage 88 is splined at 89 to driving spline 90 mounted on the output shaft 64, the output spider 88 will adjust axially to evenly load races 67 and 68 which in turn causes loading of the inner race 66. The loading on the inner race 66 is transmitted to the inner first stage race 65 which in turn loads race 69. Since the Belleville spring 84 acts on shaft 83 through the medium of head 87 on the threaded shaft 86, inner races 65 and 81 load the outer races 69 and 70.

In both modifications a Belleville spring is used to load all races. A Belleville spring can be initially loaded so that deflections in use will be in the negative spring-rate range of the spring which is very desirable for this application since it prevents building up excessively high contact pressures due to the changing wedging angles between the balls and the races. When using a Belleville spring the torque remains substantially constant throughout the entire speed range while a conventional spring load would result in a much greater torque at high speed than at low speed and such a characteristic is not desirable, as a rule, for variable speed transmissions. Also common to both modifications is the fact that the output ring is connected to the output shaft through a splined connection. The spline is important in that it permits axial movement of the output ring to equalize the ball pressures thereon. This, in turn, makes use of only one spring to load all races feasible.

Although but two embodiments of the present invention have been illustrated and described, it will be apparent to those skilled in the art that various changes and modifications may be made therein without departing from the spirit of the invention or from the scope of the appended claims.

We claim:

1. A variable speed transmission comprising, a first stage including an input shaft, a cage rotatable with the shaft, a plurality of balls engaged by the cage for rotation therewith, said balls having rolling contact with a sun and a ring ball race, said ring race being non-rotatable, a second stage including a sun race connected to the sun race of the first stage, a cage member rotatable about the shaft axis, a ring race member, a plurality of balls engaged by the cage member of the second stage and having rolling contact with the sun and ring races of the second stage, and an output shaft drivingly connected to one of said members, the other of said members having the same state of motion as its counterpart in the first stage.

2. A variable speed transmission according to claim 1 in which the ring race of the first stage is split in a plane normal to the shaft axis, and means for varying the spacing between the split ring race parts.

3. A variable speed transmission according to claim 2 in which the first stage sun race is split to change contact with the first stage balls as the spacing between the first stage ring race varies, and spring means urging the split sun race parts towards each other.

4. A variable speed transmission according to claim 3 in which the second stage sun race is split, and spring means urging the second stage sun race parts towards each other.

5. A variable speed transmission according to claim 4 in which each part of each split sun race is connected to a part of the other split sun race.

6. A variable speed transmission according to claim 5 in which the connection between parts of both sun races permits relative axial movement between the parts of each sun race.

7. A variable speed transmission according to claim 6 in which the output shaft is connected to the ring member of the second stage and the cage member of the second stage is connected to the input shaft.

8. A variable speed transmission according to claim 7 in which a single spring is employed to bias the races of both stages into contact with the balls.

9. A variable speed transmission according to claim 8 in which the ring race of the second stage is split and the parts thereof are yieldably biased towards each other.

10. A variable speed transmission comprising, a first stage including a step-up transmission having a rotating sun and a non-rotating ring, and a second stage including a differential having a rotating sun and a rotating ring, each stage having planetary members means driving the planetary members of both stages in unison, the sun of the first stage being the output of the first stage and rotating in unison with the sun of the second stage.

11. A variable speed transmission according to claim 10 in which each planetary includes balls, and the sun and ring in each stage comprise races in which the balls roll.

12. A variable speed transmission according to claim 11 in which the outer race of the first stage is split with one half fixed and the other half axially movable.

13. A variable speed transmission according to claim 12 in which both sun races are mounted on a common shaft and each sun race is split, and means biasing the split halves to engage the balls, said shaft being supported solely by contact of the races with the planetary balls.

14. A transmission according to claim 13 in which the biasing means exerts diametrical forces on the balls of each stage whereby all races firmly engage the balls associated therewith.

15. A transmission according to claim 14 in which the planets of both stages rotate in unison and the ring of the second stages is the output of the transmission.

16. A transmission according to claim 15 in which the biasing means comprises a single spring.

17. A variable speed transmission comprising, an input member including means for engaging and driving two stages of planetary balls, two stages of sun and ring races for the balls, planetary balls engaged by the input member and having rolling contact with the sun and ring races in each stage, the ring and sun of the first stage being adjustable to adjust the orbit of the balls in the first stage, the ring of the first stage being non-rotatable, the suns of both stages being connected for rotation in unison, and an output shaft connected to the ring of the second stage.

18. A variable speed transmission according to claim 17 in which the ring of the second stage is connected to the output shaft by means of a spline which permits relative axial movement between the ring and shaft.

19. A variable speed transmission according to claim 18 including a single spring acting on all the races to hold the races in contact with the balls.

20. A variable speed transmission comprising, a first stage including step-up transmission having a rotary sun and a nonrotating ring, and a second stage including a differential having a rotating sun and a rotating ring, each stage including planetary balls, means driving the balls of both stages in unison, the sun of the first stage being the output of the first stage and rotating in unison with the sun of the second stage, the sun and ring in both stages being races in which the balls roll, the sun and ring races of the first stage being split and the sun race of the second stage being split, means for adjusting the axial spacing between the parts of the split ring race of the first stage, and spring means acting on all the races to maintain contact between the races and balls.

21. A variable speed transmission according to claim 20 in which the ring race of the second stage is splined to an output shaft to allow axial movement of the second stage ring race relative to the shaft.

References Cited in the file of this patent

UNITED STATES PATENTS

| | | |
|---|---|---|
| 1,112,711 | Martins | Oct. 6, 1914 |
| 1,526,493 | Dolton | Feb. 17, 1925 |
| 2,205,768 | Pearce | June 25, 1940 |

FOREIGN PATENTS

| | | |
|---|---|---|
| 477,537 | Great Britain | Jan. 3, 1938 |